May 26, 1936.　　　　P. J. HAAS　　　　2,042,255

HOLDER AND WIPER

Filed May 25, 1935

INVENTOR.
Philip J. Haas
BY
ATTORNEY.

Patented May 26, 1936

2,042,255

UNITED STATES PATENT OFFICE 2,042,255

HOLDER AND WIPER

Philip J. Haas, Chicago, Ill.

Application May 25, 1935, Serial No. 23,449

4 Claims. (Cl. 15—210)

This invention relates to a pad that may be used as a holder for pans and the like and also as a wiper.

The principal object of this invention is to provide a simple and effective pad of resilient material usable both as a holder and wiper.

Another object of the invention is the provision of a unique pad of resilient material folded at its center or elsewhere and clamped on a line slightly spaced from the fold and parallel thereto to provide an ever open pad or wiper.

Still another object of this invention is the provision of a pad of any suitable, flexible, deformable, resilient material that is folded and sewed, or otherwise suitably clamped or secured at a restricted portion thereof to provide a self opening pan or pot pad or wiper.

A still further object of this invention is the provision of a pad of resilient material that is folded and clamped so as to spread into a V-shaped body leaving an open throat resembling a V in cross section.

Another object of this invention is provision of a pad and wiper of sponge-like material that is so formed that it has an always open throat between the sides thereof.

These objects, and the other objects that may hereinafter appear, are obtained by the novel construction, unique combination and improved arrangement of elements which constitute the invention, one embodiment of which is hereinafter described and illustrated in the accompanying single sheet of drawings, hereby made a part of this application, and in which.

Like reference characters are used to designate similar parts in the drawing and in the following description.

Figure 1:
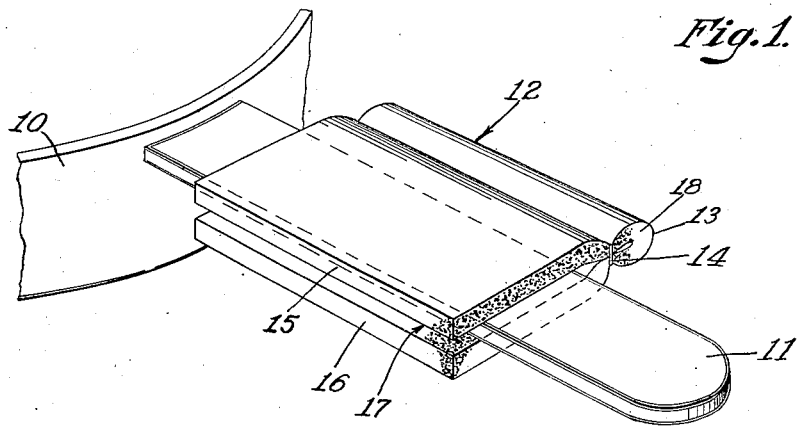
Figure 1 is a perspective view of a holder embodying the invention in effective position on a pan handle.
Figure 2:
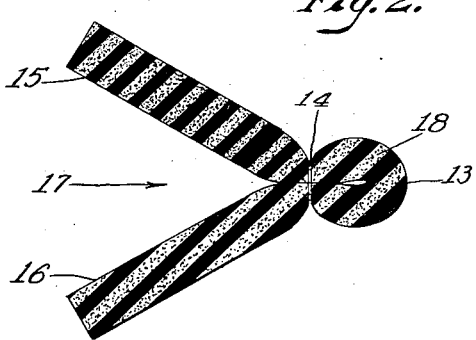
Figure 2 is a cross section of the device shown in Figure 1, the leaves being shown in a normal position.

A utensil 10 having a handle 11 and a holder 12 are shown in Figure 1. The holder 12 comprises a flat rectangular relatively thick section of sponge rubber folded on its median line 13, thus generating two leaves of material extending from such median line. Stitches 14 are taken through the two thicknesses of the material along a line parallel to, and slightly removed from, the median line. The material generally possesses a sheet rubber or nonporous lamination at its outside. When the stitches 14 are drawn tight, as it should preferably be, the material of the holder is locally compressed in a restricted area along the line of the stitches. The material at each side of the stitches resists deformation, causing the leaves 15 and 16 to spread apart to provide a V shaped throat 17 at one side of the stitches and a cylindrical bead 18 at the other side of the stitches.

By compression, the leaves 15 and 16 may be pressed about a handle of a utensil or similar article when it is desired to protect the hand from heat or from being soiled by contact with such handle. The desired position of the hand on the holder 12 is obtained by placing the palm of the hand against the bead 18, wrapping the fingers about the leaf 16, and placing the thumb and heel of the thumb against the leaf 15. Thence, by squeezing the hand about the leaves and against the handle, a firm grip is obtained on the handle. The firmness of the grip is aided by the suction resulting from pressing the sponge rubber against the handle.

The holder 12 because of its absorbent nature may be used to wipe foreign material from the handle of the utensil. If so used, the holder 12 may be washed and kept in a sanitary condition for subsequent use.

While the material of the holder is preferably a sponge rubber, it is evident that the holder could be constructed of any suitable, flexible, deformable, resilient material. Obviously such material may be clamped by other conventional securing means.

Figure 3:
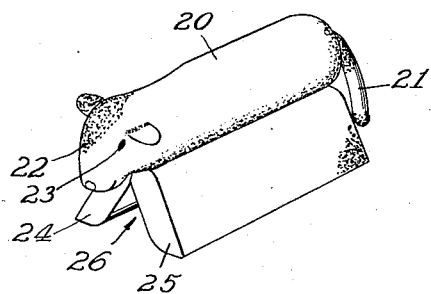
Figure 3 is a perspective view of a modification of the form of invention shown in Figures 1 and 2.

A modification of the invention is illustrated in Figure 3 of the drawing. In this form, the device is made of a soft spongy absorbent material which is free from an outer nonporous sheet or lamination. The body 20 is folded and trimmed to simulate a lamb having a tail 21 and a head 22. Beads 23 are added to simulate eyes. The leaves 24 and 25 depending below the fold line simulate the legs of the lamb. A throat 26 is formed therebetween by the spreading of the legs.

The throat 26 is adapted to receive for wiping, a writing pen point or similar articles. To wipe a pen point, the point is held between the leaves 24 and 25, the thumb and forefinger gripping the sides of the leaves 24 and 25 and pressing them together against the pen point. The pen point when withdrawn from the closed throat will be wiped clean against the inside of the leaves 24 and 25. The sponginess of the material produces a suction effect facilitating the cleaning of the pen while the spongy body of the material itself provides a most effective wiper.

While the modified device shown in Figure 3 is described as made of a spongy absorbent material, it is apparent that any other suitable material may be used. It is also apparent that the device shown in Figure 3 may be formed to any other selected configuration.

The modified form of the invention illustrated in Figure 3 is sewed or otherwise clamped close to the median line of the body material, but it is obvious that the body 20 and the legs 24 and 25 could be formed separately and secured together in a suitable manner.

Either form of the invention may be maintained in a highly sanitary state. The material employed lends itself to the absorption of soapy water because of its porosity which water may be squeezed out without difficulty because of the high compressibility of the material. There should never be an accumulation of grease on the holder as is conventional with cloth holders.

The ink that collects on the wiper when used as a pen wiper may readily be removed by soap and water. The wiper, hence, is not only more efficient than a cloth wiper but also more sanitary.

What is claimed as new and is desired to be secured by Letters Patent of the United States is:

1. A holder and wiper comprising a pair of leaves having portions in a flatwise relation, said leaves being of flexible, deformable, resilient material, and fastening means extending through and joining said leaves along a line through said portions in a flatwise relation and compressing the material of the leaves along said line.

2. A holder and wiper comprising a pair of leaves forming a folio, said leaves being of flexible, deformable, resilient material, and fastening means extending through and joining said leaves along a line parallel to the folded back of said folio, said fastening means compressing the material of the leaves along said line.

3. A holder and wiper comprising a pair of sponge rubber leaves forming a folio, and fastening means extending through and joining said leaves along a line parallel to the folded back of said folio, said fastening means compressing the material of the leaves along said line.

4. A holder and wiper comprising a pair of opposed leaves of flexible, deformable, resilient material, said leaves being compressed together along a line remote from an edge thereof and secured to each other along such line.

PHILIP J. HAAS.